United States Patent [19]
Abbe

[11] 3,805,150
[45] Apr. 16, 1974

[54] ENVIRONMENT IMMUNE HIGH PRECISION CAPACITIVE GAUGING SYSTEM

[75] Inventor: Robert C. Abbe, Newton, Mass.

[73] Assignee: ADE Corporation, Newton, Mass.

[22] Filed: Sept. 27, 1972

[21] Appl. No.: 292,700

Related U.S. Application Data

[62] Division of Ser. No. 64,240, Aug. 17, 1970, Pat. No. 3,706,919.

[52] U.S. Cl.............................. 324/61 R, 324/DIG. 1
[51] Int. Cl............................................. G01r 27/26
[58] Field of Search...................... 324/61 R, DIG. 1

[56] References Cited
UNITED STATES PATENTS

| | | | |
|---|---|---|---|
| 3,227,951 | 1/1966 | Dykaar | 324/61 R |
| 3,323,699 | 6/1967 | Bricker, Jr. | 324/61 R X |
| 3,400,331 | 9/1968 | Harris | 324/61 R |
| 3,519,922 | 7/1970 | Nash et al. | 324/61 R |
| 3,523,246 | 8/1970 | Hall et al. | 324/61 R |

Primary Examiner—Stanley T. Krawczewicz
Attorney, Agent, or Firm—Chittick, Thompson & Pfund

[57] ABSTRACT

A capacitive probe having at least two electrically conducting probe tips or electrodes centrally placed within an electrically conducting housing and axially displaced from each other within the housing. A physical dimension is measured by determining the capacitance between one probe tip and a surface, the capacitance therebetween varying with the dimension being measures. Precise machining of planar probe tips and assemblies to make them identical, their close placement, and the use of a moisture impenetrable dielectric for supporting the tips within the housing insure precision measurement and environmental independence. This precision and its maintenance is augmented by electronic excitation circuitry for the probe tips which maintain the instantaneous electric potential on each tip approximately equal and which gives an output signal whose average variation from a ground or common potential is directly indicative of the distance being gauged. Modifications to the basic probe construction include: provisions for guarding each probe tip with a substantially equal potential: thin or thick film deposition probe tip constructions; and probes having a plurality of tips for sensing a multiplicity of factors influencing the capacitance between the probe and a surface with circuits for separating the factors. A specific application of this for dielectric strip width measurement is presented.

24 Claims, 21 Drawing Figures

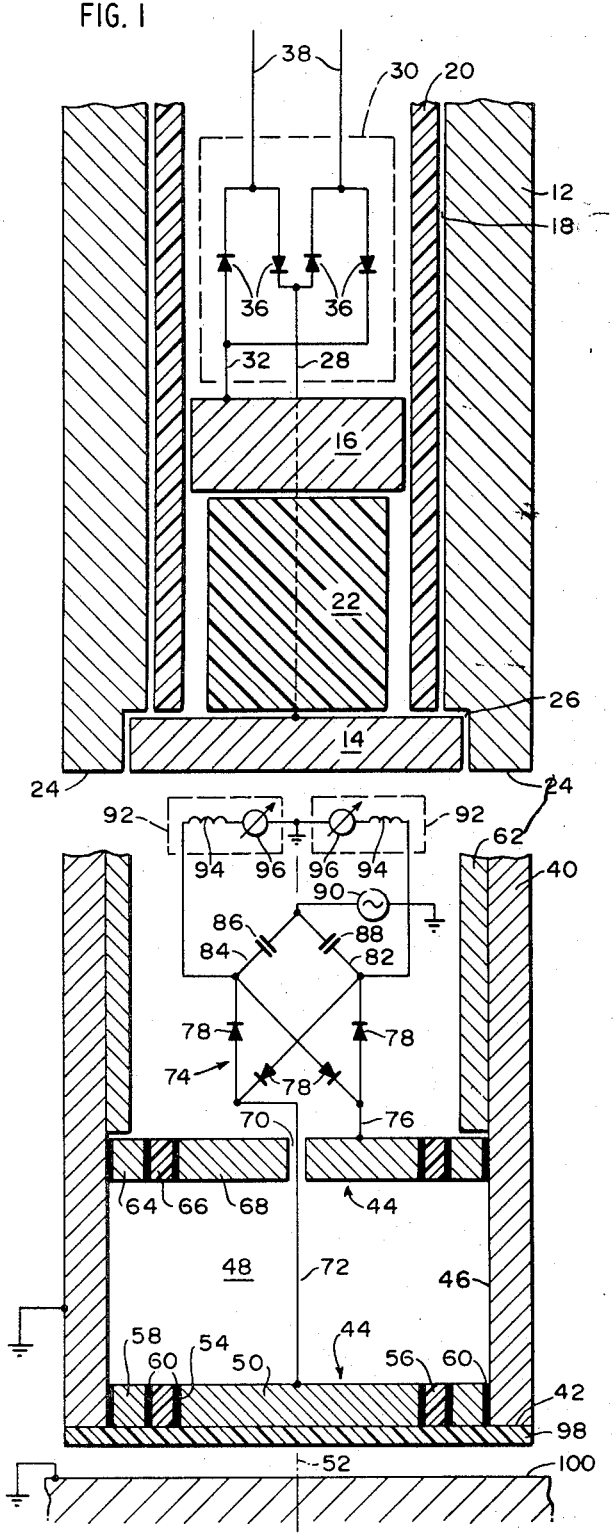
FIG. 1
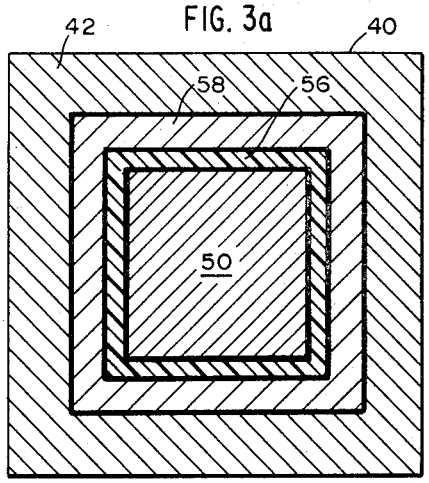
FIG. 3a
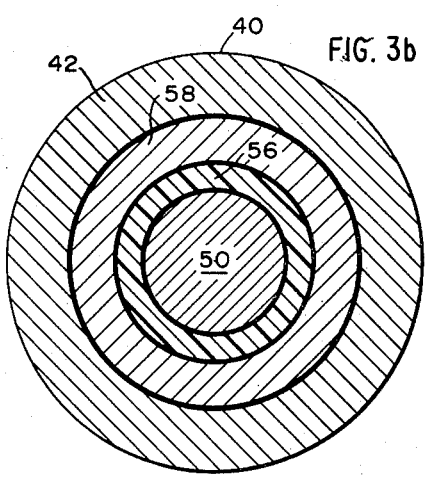
FIG. 3b
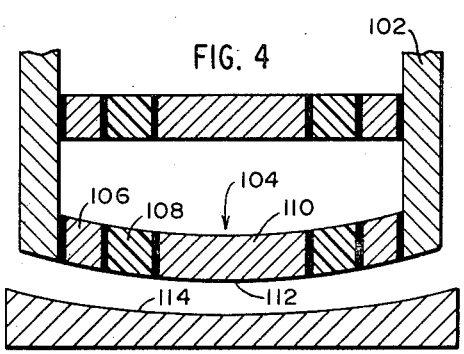
FIG. 4
FIG. 2

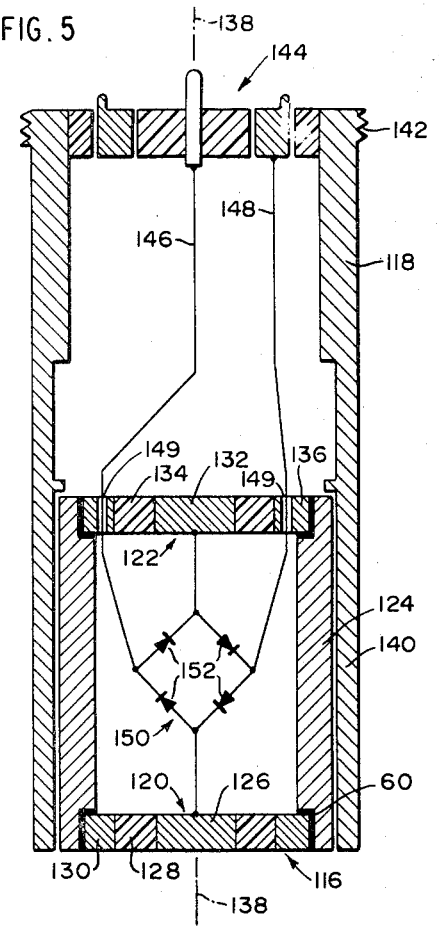
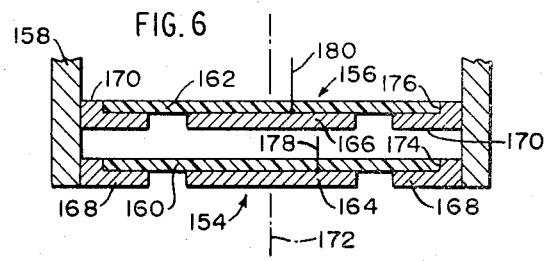
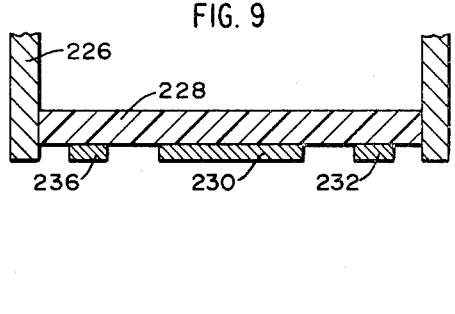
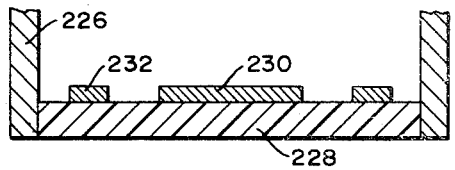
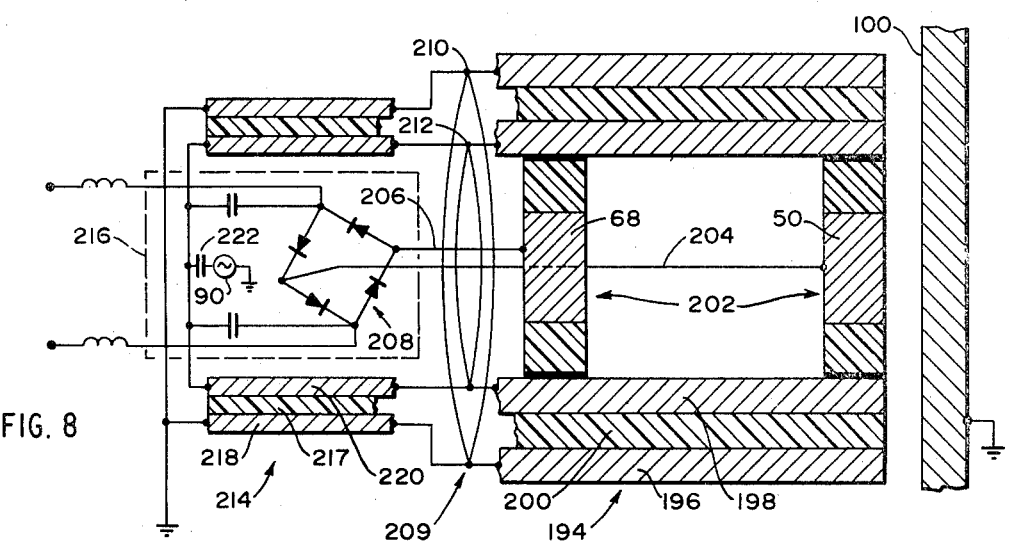

ENVIRONMENT IMMUNE HIGH PRECISION CAPACITIVE GAUGING SYSTEM

CROSS REFERENCE TO RELATED APPLICATION

This is a division of application Ser. No. 64,240, filed Aug. 17, 1970, now Pat. No. 3,706,919.

BACKGROUND OF THE INVENTION

Highly accurate and automatic non-contact dimensional or distance gauging has increasingly important industrial applications today, particularly where variations of small fractions of an inch must be measured.

Where metallic sheets, bearings, or other surfaces are formed to very stringent dimensional tolerances, it is often necessary to monitor the forming process or finished product for progress towards or compliance with the dimensional constraints. This same control is also necessary in the manufacture of dielectric or non-conducting forms. Often variations in fractions of a mil or less are significant.

While monitoring of these dimensions is possible today, it is a costly operation particularly where large areas must be monitored. This requires a laborious and a time consuming equipment set up equipment calibration, and surface investigation. What is needed by the industry is a highly accurate automatic readout gauge which will maintain its accuracy under varying use and environment conditions. Such a gauge must be flexible enough to adapt itself to use in a wide variety of applications, to make distance measurements across small areas between surface and gauge and yet be able to scan large areas of surface for dimensional compliances.

It is, of course, known that the variation in capacitance between an electrode and a surface can be used to obtain an indication of the variation in distance between the electrode and the surface. This art has undergone some refinement but lacked the accuracy, flexibility and repeatability of the herein disclosed invention.

Among the problems of the prior art designs were large stray capacitances and thermally or environmentally induced variations in them. These variations caused large changes in electrical output signls of circuitry operating with the probe despite no variation in the capacitance being sensed. The size of the prior art probes was correspondingly limited as to minimum dimensions, making them inappropriate for a great many applications. Additionally, prior art approaches to probe excitation, including ordinary bridge circuitry, caused differently varying and different instantaneous voltages to appear on internal capacitance sensitive probe electrodes. This type of excitation fostered electrode interactions with accompanying instabilities that further reduced the utility of previous designs.

When using capacitance to measure variations in distance between an electrode and a surface or to measure variations in a capacitance affecting substance intervening between the electrode and the surface, variations in other parameters may affect the measured capacitance and generate an erroneous indication. To compensate for the error induced by the variations in these unwanted parameters, additional electrodes can be added to measure capacitance variations between themselves and the surface with these capacitance variations produced in different ways by variations in the parameters affecting those capacitances. The resulting multiplicity of relationships between a multiplicity of variable parameters allows their independent isolation or elimination.

The present invention was developed in part from an investigation of the faults of earlier dual electrode capacitance sensing probes which failed to maintain or achieve the desired accuracies in sensing capacitance between itself and a surface.

According to this invention a dual electrode capacitive sensing probe can be designed that overcomes the drawbacks of the prior art probes and achieves the consistent accuracy sought.

It is thus a general object of this invention to provide a capacitive probe for sensing the capacitance between itself and a surface which achieves a high degree of initial accuracy in detecting this capacitance and its variations.

It is a further general object of this invention to provide a capacitive probe for sensing the capacitance between itself and a surface which maintains a high degree of accuracy in the measurement of this capacitance and its variations in the face of environmental influences.

It is a more specific object of this invention to provide a capacitive probe for sensing the capacitance between itself and a surface which eliminates the error inducing effect from the presence of foreign materials or contaminants in the probes environment.

It is a further specific object of the present invention to provide a capacititive probe for sensing the capacitance between itself and a surface which probe has either a dielectric support for its electrodes or a covering over its measuring electrode which is impenetrable to and non-absorptive of foreign matter and contaminants from the probe's environment.

It is a further specific object of this invention to provide a capacitive probe for measuring the capacitance between itself and a surface wherein excitation circuitry for the electrodes of the probe is designed to minimize the effect of unwanted influences from the probe's environment.

It is a further specific object of this invention to provide a capacitive probe for measuring the capacitance between itself and a surface where the excitation circuitry for the probe has an output signal whose average variation from a ground or common reference is the indicium of the varying capacitance being measured.

It is a further specific object of the present invention to provide a capacitive probe for measuring the capacitance between itself and a surface which may be conveniently guarded to maintain the basic theoretical relationship between the capacitance and the distance from the measuring electrode to the surface.

It is a further specific object of this invention to provide a capacitive probe for measurng the capacitance between itself and a surface, where a plurality of measuring electrodes are provided to sense a plurality of parameters affecting the capacitance between the probe and the surface in a manner which permits electronic processing to separate each parameter.

BRIEF SUMMARY OF THE INVENTION

In an exemplary preferred embodiment of the present invention a capacitive probe is shown comprising an electrically conducting cylindrical housing enclosing measuring and balancing electrodes or probe tips which are centrally placed within the housing and displaced axially from each other but still close to each other along a central axis of the housing. The measuring electrode is placed across an open end of the housing where it can be conveniently placed within practical capacitance sensing distance of an electrically conducting surface for sensing the capacitance between the measuring electrode and the surface. Each electrode is formed substantially identically to the other in a relatively thin plate or disc-shape. Each electrode is dielectrically supported within the housing with precisely maintained distances through the dielectric between the periphery of each electrode and the nearest points of electrical conduction on the housing which may be rings or bands extending inward from the housing toward the electrode. Each assembly which includes an electrode, a dielectric support and a ring or band is designed to have a homogeneous coefficient of temperature expansion and thin shape in order to minimize and control the variation in capacitance between the housing and each electrode from environmental influences including temperature. Excitation from impedance measuring circuitry for each electrode, furthermore, maintains the instantaneous electric potential on each electrode at approximately the same level so that each electrode partially guards the other allowing their close placement without interactions between the electrodes. This construction further permits certain dimensions to be maintained to very strict tolerances while other tolerances are less tightly maintained with the resulting performance of the entire probe improved in accordance with the strictness of the tight tolerances.

The level of accuracy sought for this probe has necessitated a selection of dielectrics for supporting the electrodes which are specially impenetrable and non-absorptive of foreign matter and contaminants from the environment of the probe. Unless care is taken to select a dielectric with very low absorption, minute absorption quantities have been found capable of causing erratic operation of the probe and unbalance in the capacitance between housing and electrodes.

An alternative exemplary embodiment shows each electrode formed as an electrically conducting deposition upon a dielectric substrate and surrounded by an electrically conducting band also on the substrate. A hole may be used to perforate the interior or balancing electrode within the housing to pass some of the fringe field effecting the balancing electrode into a region where it can affect the measuring electrode.

In a further exemplary modification, a guard ring may be provided as either a second inner dielectrically spaced conductor on the housing or a surrounding electrically conducting deposition on a substrate. The guard ring is maintained at approximately the same voltage as each electrode by the excitation from the impedance measuring circuitry. The guard ring increases the effective dynamic range of distance or capacitance which can be measured between the measuring electrode and the surface, lowers the capacitances from housing to electrodes and/or allows location of the excitation and impedance measuring circuitry remotely from the capacitive probe instead of housing it in a chassis directly associated with the probe.

A multiple electrode probe modification is shown having several sets of measuring electrodes and optionally an identical balancing electrode located behind each measuring electrode inside a housing. In particular where a dielectric strip is moved over a path between the measuring electrodes and a surface and where it is desired to sense variations in the width of the strip, three, four, or five sets of electrodes are used to sense three, four or five different capacitances varying with the strip width thickness, and dielectric constant and the spacing between the probe and surface. Each capacitance depends on these parameters in different ways so that processing electronics can isolate one dimension by eliminating variations in the other dimensions' capacitances.

Exemplary impedance measuring circuitry associated with each probe comprises an oscillator supplying alternating electric excitation to two DC blocking impedance arms which are connected to opposite junction points of a diode ring. The remaining two opposite junction points between diodes are connected to measuring and balancing electrodes respectively. AC return is through the housing as ground to the oscillator. A DC return and indicator circuit comprising a serially connected inductor and DC meter indicates a DC offset representative of the unbalance in the capacitance to ground between the measuring and balancing electrodes.

The features of this invention will be more clearly understood by referring to exemplary preferred embodiments in the below detailed description in conjunction with the following drawings of which:

FIG. 1 is a vertical section and partial schematic view of a basic form of probe and exciting ring circuit;

FIG. 2 is a vertical section and partial schematic view of a probe and circuitry exemplary of the invention;

FIGS. 3A and 3B are cross-sectional end view of two forms of probe suitable to the construction of FIG. 2.

FIG. 4 is a sectional view of a probe with a modified probe tip assembly;

FIG. 5 is a sectional and partial schematic view of a modified probe showing a complete housing and readily manufactured insert;

FIG. 6 is a sectional view of a modified probe design using metal deposition techniques;

FIG. 8 is a sectional and partial schematic view of a capacitive probe having guarding means;

FIG. 9 is a sectional view of a partial probe having guarding means produced by metal deposition techniques;

FIG. 10 is an alternative orientation for a probe tip assembly of the construction of FIG. 9;

Figure 14:
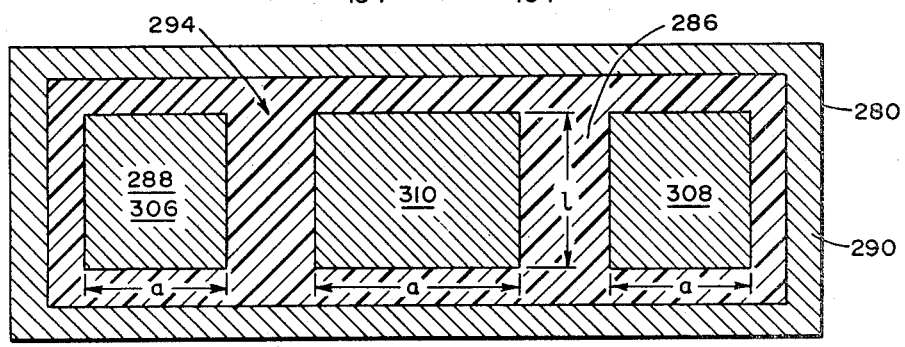
FIG. 14 is a sectional view on line 14—14 of FIG. 13.
Figure 13:
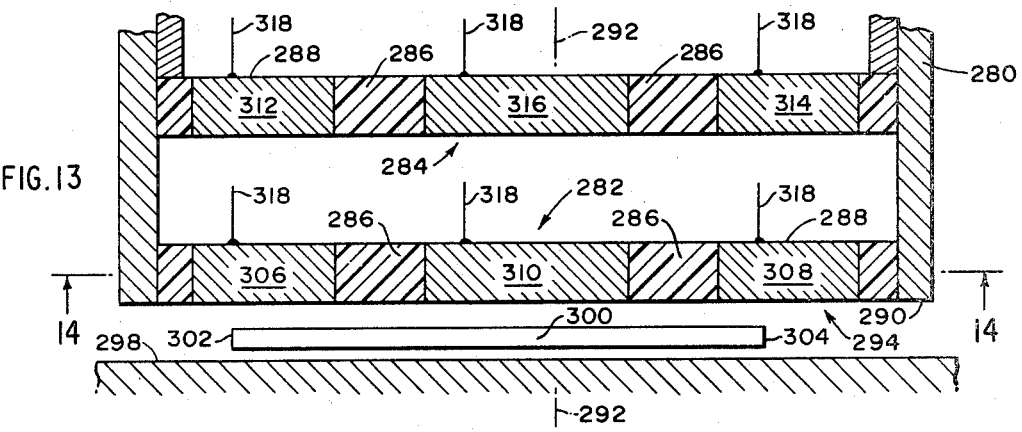
FIG. 13 is a sectional view of a multiple electrode capacitive probe used for sensing the width of a dielectric strip.
Figure 18:
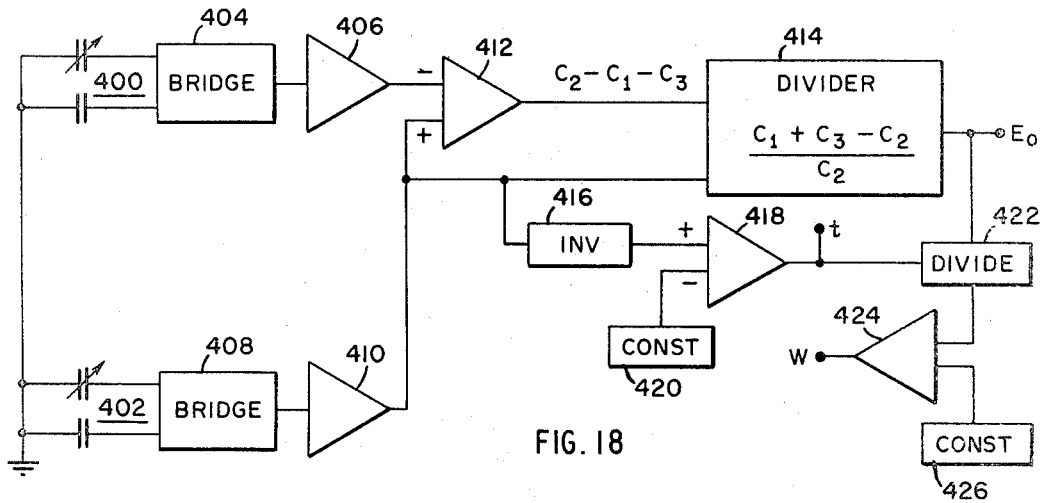
Figure 16:
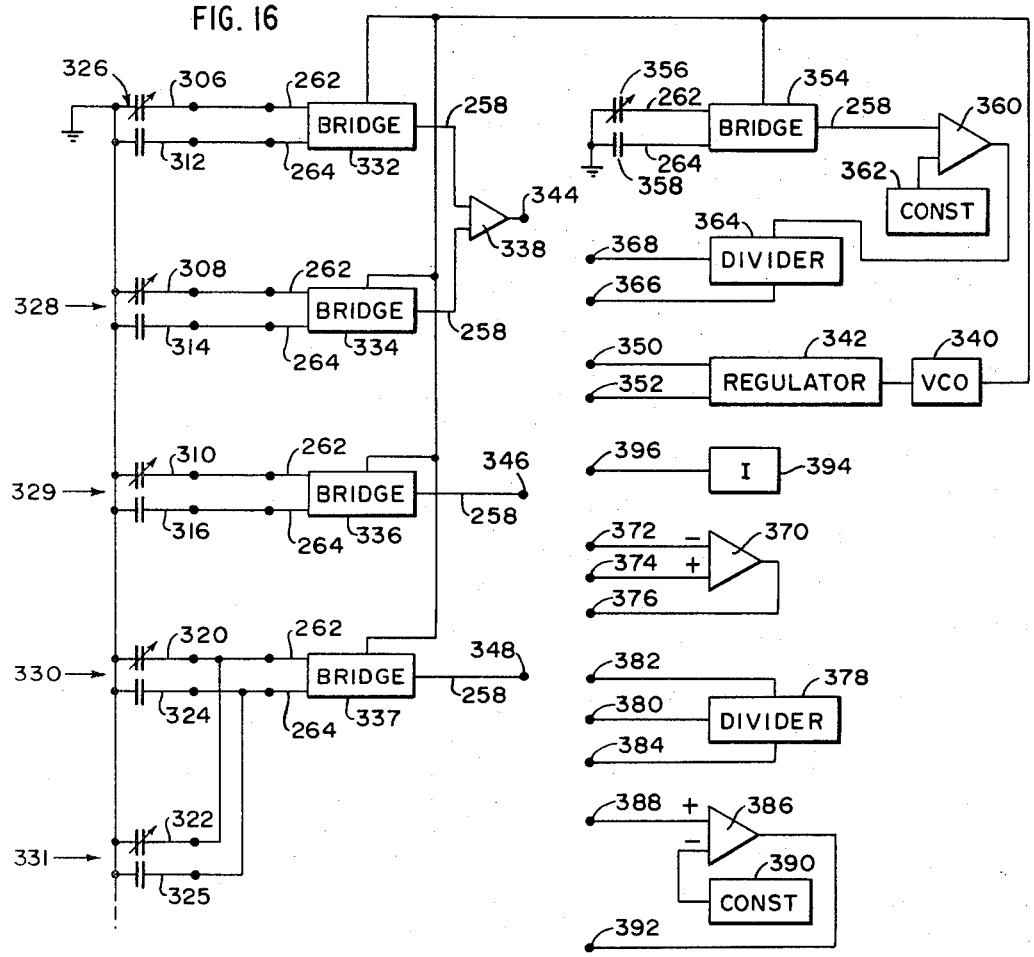
FIG. 16 is a block diagram and partial schematic of processing circuitry for the capacitive probes of FIGS. 13, 14, and 15 and showing a plurality of terminals which can be interconnected with each other in numerous ways.
Figure 17A:
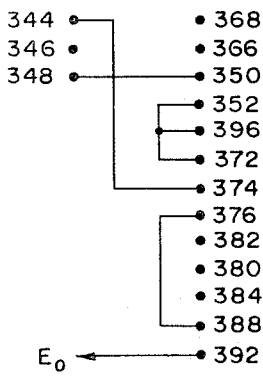

FIGS. 17a, b, and c show alternative interconnection systems for the terminals of FIG. 16; and, FIG. 18 shows in block diagram and partial schematic view a alternative processing circuit for the capacitive probe of FIGS. 13 and 14.

DETAILED DESCRIPTION OF THE INVENTION

Referring to FIG. 1 there is shown in sectional and partial schematic view a capacitive probe previously sold in the United States comprising cylindrical electrically conductive probe tips 14 and 14 with a cylindrical dielectric spacer 22 separating them. The tip 16 has a greater radius than the tip 14 and the spacer 22 has the smallest radius of the three. Initially the probe tip 14 is substantially longer in the axial direction than as shown in FIG. 1, the ultimate form for the tip. The initial combination of the two tips are then electrically connected to opposite junctions of a serially joined diode ring 30 via electrical leads 28 and 32 contacting tips 14 and 16 respectively. This entire sub-assembly is inserted within an electrically conducting housing 12 and inner dielectric sleeve 20 where they are potted in place by any of the commonly available potting compounds. An open end 24 of the housing 12 has a region of enlarged diameter 26 to accommodate the tip 14 of greater radius. The open end 24 and the tip 14 are then machined back until there is equality in the capacitances between the housing 12 and the two tips 14 and 16 respectively. Two electrically conducting leads 38 are connected to the remaining two junction points on the ring 30, pass through the housing 12 away from the open end 24, and are ultimately connected to additional circuitry.

The advantages of the improved capacitive probe can be better understood from a description of its features as shown partially in vertical section and partially in schematic diagram in FIG. 2. As shown there, a cylindrical electrically conductive housing or cylinder 40 terminates to form an open end at 42. First and second capacitive probe tip assemblies 44 are generally planar shaped and fit within an inner wall 46 of the cylinder 40 perpendicular to an axis of the cylinder 40. The shape of the inner wall 46 in a plane perpendicular to the axis of the cylinder 40 can be any shape but is normally square, rectangular, or circular as indicated by FIGS. 3a and 3b. The outer periphery edges of the assemblies 44 are of a corresponding size and shape to allow a close fit with the inner wall 46.

The first probe tip assembly within the inner wall 46 is located at the open end termination 42 and closes off the end of the cylinder 40 from an inner region 48. The first probe tip assembly comprises a first electrically conducting disc-shaped electrode or tip 50 located with the faces of the disc-shaped tip perpendicular to a central axis 52 of the cylinder 40 and with a peripheral surface 54 of the tip 50 parallel to the axis 52 and substantially equidistant from the interior wall 46 of the cylinder 40 at all points. Further comprising the first probe tip assembly, a dielectric annulus 56 surrounds the periphery 54 of the tip 50 and acts as a dielectric gap between the tip 50 and an electrically conducting ring 58 which in turn surrounds the outer periphery of the dielectric annulus 56 and extends radially to make electrical contact with cylinder 40.

During fabrication of the first probe tip assembly a very small amount of a ductile substance such as solder may be placed as a filler 60 between the points of contact of the tip 50, annulus 56, ring 58, and cylinder 40. Typically the filler 60 is only between the ring 58 and cylinder 40 to accommodate differences in thermal expansion and insure good electrical contact over the surfaces in contact between these elements during stresses and strains produced by environmental influences. Where the tip 50, annulus 56 and ring 58 are not bound by a filler 60, fusion techniques may be used to bind them.

The second probe tip assembly is substantially identical to the first probe tip assembly and is placed between the inner wall 46 of the cylinder 40, inside the region 48, back from the open end 42 butting against a locating sleeve 62. A dielectric annulus 66 is located between a ring 64 and a tip or electrode 68 of the second assembly in identical manner to the first assembly. Filler 60 may also be added on the points of contact between the cylinder 40, ring 64, annulus 66 and tip 68, or only between the cylinder 40 and ring 64. respectively.

A hole 70 perforates the tip 68 parallel to the axis 52 and allows an electrical lead 72 to pass from a point of electrical contact with the tip 50 to a diode matrix 74 located on the opposite side of the second tip assembly. An electrical lead 76 electrically connects tip 68 within the diode matrix 74. Within the diode matrix 74 diodes 78 are serially connected in the same conduction direction to form a closed path with the electrical leads 72 and 76 connected to opposite junction points between the diodes 78. From the other two junction points on the path electrical conduction leads 82 and 84 exit from the diode matrix 74 to DC blocking impedance or capacitive arms 86 and 88 respectively At the frequency of oscillator 90 the value of the impedance of capacitors 86 and 88 is typically, but not necessarily, at least an order of magnitude lower than the capacitive impedance between the cylinder 40 and the tips 68 and 50. The opposite terminals of the capacitors 86 and 88 are fed in common by an oscillator 90 whose other terminal is electrically connected to the cylinder 40 which is for convenience at circuit ground. The oscillator 90 supplies an alternating electric excitation which is referenced to ground.

Two indicating circuits 92 are each composed of an inductor 94 and a meter 96 connected in series to conduct DC signals to ground from the leads 82 and 84 respectively.

Moisture impenetrable covering 98 is alternatively placed across open end termination 42 of the cylinder 40 and the outer surface of the first probe tip assembly and is sealed to the cylinder 40 at its termination 42 and optionally to the assembly 44 containing the tips 50.

The capacitive probe as above described is used to great advantage in measuring or gauging distances between the outer face of the tip 50 and a grounded conducting surface 100 by detecting through either indicator 92 the difference in the capacitance to ground of the tip 50 relative to the tip 68. For this purpose the surface 100 will normally be parallel to the outer face of the tip 50, and the entire probe fixtured in a structure, not shown, which maintains the position of tip 50 and provides a reference for gauging the distances between the tip 50 and the surface 100.

Referring still to FIG. 2, the circuit schematically outlined there operates by dividing the excitation supplied by the oscillator 90 into two capacitive arms 86 and 88. The diode matrix 74 formed as a four diode path further controls the excitation flowing through each capacitive arm 86 and 88 so that during a half cycle of a given excitation polarity excitation is conducted from each arm 86 and 88 to separate tips 50 and 68 and, thence to ground via the cylinder 40 and surface 100. During the following half cycle of the opposite polarity the diode matrix 74 effects a switching of excitation paths so that the excitation through each arm 86 and 88 is fed to the opposite tip of the tips 50 and 68 from the previous half cycle. Over repeated cycles from the oscillator 90 the leads 82 and 84 will have a slight DC offset or average voltage and/or current signal in addition to a large AC component. The amount of offset signal indicates the capacitance difference between ground and the tips 50 and 68. The AC is filtered out by the inductors 94 and only a DC signal is incident upon the meters 96 to give an indication of capacitive unbalance between ground and the two tips 50 and 68.

Because the indicators 92 measure with respect to a zero reference and only pass the offset component, the excitation of the oscillator 90 may be made very large in order to increase the sensitivity of the probe without the necessity for expensive and accurate reference circuits.

As indicated above, the capacitive reactance of the arms or capacitors 86 and 88 is usually at least an order of magnitude smaller than the capacitive reactance between the cylinder 40 and the tips 50 and 68. In this case, at any instant, the voltage across the capacitors 86 and 88 will be very small and the voltage on leads 72 and 76 connected to the tips 50 and 68 substantially equal to the voltage from oscillator 90. The average voltage on leads 82 and 84 will be very close to ground or zero as compared to the RMS value of the voltage from the oscillator 90. The resulting near equality in the voltages on the tips 50 and 68 and their structural relationships as indicated above, allows the tips to act as capacitive shields or guards for each other and be closely placed without interacting. An environmentally produced change affecting one tip thus produces a similar effect upon both of the capacitances between the cylinder 40 and tips 50 and 68 and increases environmental independence.

By accurately machining the probe tip assemblies 44, further unexpected improvements are achieved in the probe's immunity from environmental influences operating to destroy the equality of the capacitances between the cylinder 40 and the tips 50 and 68. To see this more clearly, each probe tip assembly 44 must be viewed as a coaxial capacitor in which the axial length of the capacitor is short compared to the difference in radius of the inner end and outer conductor. In the usual coaxial capacitor, the capacitance is a direct function of the axial length of the capacitor and an inverse function of the logarithm of the ratio of the radii of the inner and outer conductors. The fringe field is normally ignored. If the inner and outer conductors and the dielectric material between them are chosen to have equal coefficients of temperature expansion, a temperature change for the coaxial capacitor will not alter the ratio of the radii of the inner and outer conductors, but will effect the axial length of the capacitor and therefore, the capacitance of such a coaxial capacitor will vary directly with the temperature coefficients of the material from which it is made.

As the height or axial length of the coaxial capacitor is decreased until this length is only a small portion of the difference between the radii of the inner and outer conductors, the axial length of the capacitor is a less significant factor in its total capacitance. The contribution of the fringe fields to the total capacitance will be substantial. Thus, with small axial lengths the ratio of the radii of the inner and outer conductors can be made a more significant factor in the capacitances between the cylinder 40 and the probe tips 50 and 68. By selecting materials for the tips, rings and annuli with equal temperature coefficients these capacitances can be kept more nearly non-varying with temperature changes.

By accurately machining the dimensions listed below, the probe tip assemblies 44 can be made nearly identical over crucial dimensions with the result that they have equal initial capacitance to a very high accuracy. This equality then can be maintained over a large temperate range because of the low temperature dependence indicated above. There results an electronic capacitive probe of vastly improved accuracy and environmental independence.

The dimensions which it has been found particularly important to control are the following:

a. the circumference and the axial length of the periphery of the tips 50 and 68 (axial length being less important when it is very small);

b. the circumference and the axial length of the inner surfaces of the rings 58 and 64; and c. the spacing between the inner wall of the rings 58 and 64 and the periphery of the tips 50 and 68 through the dielectric annuli 56 and 66 and the axial length of the annuli 56 and 66 to maintain the spacing of the concentric capacitor formed between the rings and tips.

With these dimensions kept to a tolerance of ± 0.0001 or ± 0.0002 inches a probe of great accuracy and sensitivity is explained above. Maintenance of these dimensional tolerances also insures a high degree of repeatability in the sensitivity from one probe to another. The sensitivity is defined as change in capacitance between the first probe tip 50 and ground with respect to changes in the distance between the surface 100 and the outer face of the tip 50.

Other dimensions in the probe are less critical than those mentioned above and may be held to normal machining tolerances without a loss in the accuracy, environmental immunity, or other performance characteristics of this probe. The guarding effect of each tip 50 and 68 upon the other also helps to reduce the required machining accuracy in the inner wall 46 and the spacing between tips.

In deciding the radial distance between the outer peripheries of the tips 50 and 68 and the inner surface of the rings 58 and 64, or the radial thickness of the annuli 56 and 66 an important factor is the expected maximum distance between the tip 50 and the surface 100 under the conditions of probe use. As this distance increases, significant portions of the electrostatic flux between the outer face of the tip 50, of the first assembly and points of ground potential will run to the ring 58 instead of to the surface 100. A corresponding reduction in the sensitivity of the probe is experienced by this "flux switching." The design of the dielectric annuli 56 and 66 can therefore be made with a view toward the maximum expected distance between the probe tip 50 and the surface 100. A practical rule for the radial thickness of the annuli 56 and 66 is to make the thickness twice the maximum expected distance between the tip 50 and the surface 100.

A few additional constraints on the general location of surfaces must be observed: 1. The inner wall of the sleeve 62 is important as it effects the fringe field from the second probe tip assembly 44 and therefor it should intercept the ring 64 well beyond the interface between the ring 64 and the dielectric annulus 66; 2. In the event that the surface 100 to which the distance from the probe is to be measured, is either ungrounded or non-conducting, the cross-sectional combined areas of the ring 58 and cylinder 40 facing toward the surface 100 should be respectively one or two orders of magnitude greater than the cross sectional area of the tips 50 facing toward the surface 100. This latter constraint establishes a much lower impedance from the grounded cylinder 40 to the surface 100 than from the tip 50 under the conditions of an ungrounded or non-conducting surface 100.

Another major constraint upon the construction of the probe and one which is important to securing a high degree of accuracy in any environment is that tips 50 and 68, the dielectric annuli 56 and 66, and the rings 58 and 64 possess a similar coefficient of thermal expansion. One combination which satisfies this thermal expansion requirement comprises KOVAR tips and rings and glass dielectric annuli.

In a normal working environment for a probe of the design indicated above the hygroscopic properties of the material used for the dielectric annuli 56 and 66 are of great significance. The slightest absorption of water or other material from the environment of the probe into the dielectric annuli 56 and 66 or the interior volume 48 can alter the two capacitances between the cylinder 40 and the tips 50 and 68 to an extent that destroys the accuracies otherwise obtainable with a probe having the above indicated construction.

To achieve accurate operation of the probe, the dielectric annuli 56 and 66 should be formed from a material having a very low index of absorption of water or other foreign material which may be in the environment of the probe.

The dielectric in the annuli 56 and 66 should also form an impenetrable barrier against entry of water or foreign material from the environment of the probe to the interior 48. The substance forming the tips 50 and 68 and the rings 58 and 64 is normally a metal which is inherently non-absorptive and impenetrable. The ductile filler 60 helps to completely seal the interior 48 of the probe from its environment.

Examples of substances for the annuli which fulfill both the requirements for hygroscopic properties and temperature coefficient of expansion are hard or soft glass, $Al_2O_3$, and other oxides of metals which are not semi-conducting. Particularly to be avoided are most epoxy-type dielectrics or potting compounds, it having been found from their use in the earlier probes of FIG. 1 construction that absorption by and penetration through these dielectrics destroys the probe's accuracy and value.

Alternately, or additionally, the coating 98 in FIG. 2 may be applied across the open end 42 and first probe tip assembly 44 of the probe. This coating is designed as a barrier against the penetration of water or other foreign material from the environment of the probe into the dielectric annuli 56 and 66 and the interior 48. The use of the coating 98 is desirable even in the case of non-absorptive dielectric annuli 56 and 66 because some water or foreign material may collect on the surfaces not only of the dielectric annuli but of the conducting rings 58 and 64 and tips 50 and 68. Coverings which have been found to be particularly good for this purpose are silicone organic compounds in general and titanium dioxide ($TiO_2$). Also oxides of the metals aluminum or beryllium may be used.

Several variations of the probe described above have been discovered which augment certain of the advantages mentioned, improve the performance of the probe, and or reduce its cost of manufacture.

In FIG. 4 there is shown in cross-section the two probe tip assemblies of a probe basically similar to that in FIG. 2 having an external conducting housing 102 with a first probe tip assembly 104 composed of ring 106, dielectric annulus 108, and central conducting tip 110; and having a curved exterior face 112. Such a curved exterior face 112 is called for where a surface 114 from which the distance to the probe tip 110 is to be measured capacitively is itself curved over the portion facing the probe tip 110. In other applications, the curved face 112 can be used to give greater significance to certain regions between the surface 114 and tip 110 in the response of an indicator 92 than to other regions.

Referring to FIG. 5, there is shown in a cross-section and partial schematic diagram an easily manufactured probe insert 116 constrained within a cylindrical conducting housing 118.

The insert 116 comprising a first probe tip assembly 120 and a second probe tip assembly 122 held in axially displaced parallel relationship by a conducting cylindrical retaining band 124 is designed for ease of construction as an assembly and for latter easy insertion within the cylinder 118. The first probe tip assembly 120 is composed of a first electrically conducting probe tip 126 surrounded by and in contact with on its outer periphery a first dielectric annulus 128 which in turn is surrounded by and in contact with on its outer periphery a first electrically conducting ring 130.

The second probe tip assembly 122 is constructed substantially identically to the first probe tip assembly 120 and has a second electrically conducting probe tip 132, second dielectric annulus 134, second electrically conducting ring 136. Holding the first and second probe tip assemblies 120 and 122 parallel to each other and displaced along a common axis 138 is the retaining band 124 which has at both ends of its cylindrical extent a portion of increased inside diameter of sufficient depth to accept each probe tip assembly flush with the end of the band 124 and in a close fit between the inside wall of the band 124 and the outer periphery of each electrically conducting ring 130 and 136.

The tips, annuli, rings and retaining band may be of any circular square or rectangular cross-sectional shape as described above. They are equally dimensioned between first and second probe tip assemblies to the same tolerances indicated for the probe of FIG. 2.

The entire assembly 116 is designed to fit within the cylinder 118 to form the completed probe structure. The portion 140 of the cylinder 118 within which the assembly 118 is inserted is machined to have a relatively thin wall and further consists of an elastic material such as stainless steel. The thin stainless steel portion 140 has sufficient elasticity to allow the entire assembly 116 to expand the slight amount necessary during temperature expansion and contraction of the assembly 116. The assembly 116 is constructed to have a uniform coefficient of temperature expansion throughout its constituent parts by, for example, forming all electrically conducting portions of KOVAR, and the dielectric annuli of glass.

The other end of the cylinder 118 opposite the portion 140 has a threading 142 designed so that the cylinder 118 may be secured to a further terminal structure, not shown, for holding the entire probe in a defined relationship with a fixture. Hermetically sealing the end of the cylinder 118 having the thread 142 is a two contact electrical connector 144 utilized for mating with a proper two terminal connector, not shown, on the terminal structure.

Each of the two terminals in the connector 144 is connected via leads 146 and 148 respectively to opposite junction points of a diode matrix 150 comprising a continuous ring of four joined diodes 152 connected for conduction in a single direction. The other two junction points between the diodes in the ring of the matrix 150 are connected respectively to the first and second electrically conductive tips 126 and 132, as described above. The diode matrix 150 may be placed either between the connector 144 and the second probe tip assembly 122 or between the two probe tip assemblies 120 and 122 as shown.

Referring to FIG. 6, there is shown in sectional view an end region of a capacitive probe where first and second probe tip assemblies 154 and 156 are located between a conventional cylindrical conducting housing 158. The first and second probe tip assemblies 154 and 156 are composed of first and second dielectric substrates 160 and 162 respectively upon which respective electrically conducting central depositions or spots 164 and 166 are placed as a substitute for the probe tips described above.

Surrounding and spaced apart from the depositions or spots 164 and 166 on the substrates 160 and 162 are electrically conducting deposition bands 168 and 170 respectively. Each band 168 and 170 is coaxial with a central axis of each spot 164 and 166 which axis is in turn co-incident with a central axis 172 of the cylinder 158. Each substrate 160 and 162 is placed perpendicular to the axis 172 within the cylinder 158.

In forming the bands 168 and 170 by deposition, the conductive material deposited is allowed to deposit onto outer peripheries 174 and 176 of the substrates 160 and 162 respectively. With the peripheral shape of each substrate equal to the cross sectional shape of the cylinder 158, this additional deposition to the peripheries 174 and 176 allows both probe tip assemblies to fit tightly within the cylinder 158 and yield an electrical contact between the cylinder 158 and each electrically conducting band 168 and 170.

Electrical leads 178 and 180 are attached in a conventional manner to the depositions or spots 164 and 168 respectively and lead through the substrates 160 and 162 and deposition or spot 166 to circuitry as described above.

It is of course possible to place the first and second probe tip assemblies 154 and 156 respectively within a retainer band like the band 124 indicated in FIG. 5 before they are inserted into the cylinder 158.

The advantages of this construction are that the conductive elements forming the capacitive plates for the capacitance between the cylinder 158 and the central depositions or spots 164 and 166 have practically no axial dimension and thus no significant axial temperature expansion. Also the thermal expansion of each probe tip assembly 154 and 156 is determined entirely by the substrates 160 and 162 which are entirely homogeneous, have the same coefficients of thermal expansion throughout, and produce a completely uniform temperature response.

The depositions may be formed from a variety of processes including: 1. fluxed glass bonded metal suspension; 2. sputtering; 3. vacuum evaporation; and 4. electroformation. It can be appreciated that these techniques will allow economic mass production at reduced costs while maintaining the same high degree of dimensional tolerances between the first and second probe tip assemblies.

It is also possible to form the first probe tip assembly 154 with the electrical conducting depositions facing inwardly instead of outwardly as shown in FIG. 6. This will prevent damage to the surface containing the conducting elements as well as incorporate an environmental barrier in the first probe tip assembly 154 by proper selection of a non-absorptive and impenetrable substrate material, such as glass.

Figure 7:
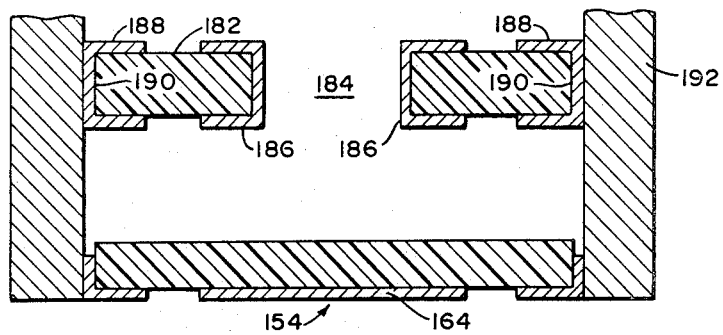
FIG. 7 is a sectional view of a capacitive probe of the type indicated in FIG. 6, but with a modified probe tip assembly.

Referring to FIG. 7 a capacitive probe is shown of the substrate-deposition type wherein a modification is shown in the second probe tip assembly. In this case, a substrate 182 forming the substrate for the second probe tip assembly is shown axially perforated with a hole 184 covering a substantial portion of the area which would otherwise have comprised the central deposition or spot of the substrate. In this case, a central deposition 186 for the substrate 182 is formed adjacent to the hole 184 and may further comprise a deposition through the hole 184 and over onto the opposing surface of the substrate 182. An electrically conducting deposition band 188 may be formed as indicated for the deposition band in FIG. 6, or, alternatively in the case where the central deposition 186 is deposited on both sides of the substrate 182, a deposition for the band 188 is made on both sides of the substrate 182 and is joined across an outer periphery 190 of the substrate 182 so as to provide an electrical connection between the band 188 and a cylindrical housing 192 for the probe tip assembly.

The purpose of the hole 184 through the substrate 182 of the second probe tip assembly is to allow the first probe assembly 154, and in particular the central deposition 164 thereon to be affected by more of the fringe field that affects the capacitance between the housing 192 and the central deposition 186 of the second probe tip assembly. This effect is further augmented when the first and second probe tip assemblies are brought close together within the cylindrical housing 192. With both central depositions having in common a large component of the fringe field the tendency for environmental changes of the capacitive probe to create inequalties in the capacitance between the cylinder 192 and the central depositions is further decreased.

Of course the hole 184 through the second probe tip assembly may be used in constructions similar to those of FIGS. 2 and 5.

Referring now to FIG. 8 there is shown in cross-sectional view and partial schematic diagram a further modification of the basic capacitive probe. Here the cylindrical housing 194 for the probe is composed of two cylindrical concentric electrical conductors, an outer conductor 196 and an inner conductor 198, having coaxially therebetween a cylindrical dielectric spacer 200.

First and second probe tip assemblies 202 are shown in FIG. 8 but will not be described in detail except to indicate that they can be of any of the above-described constructions.

Electrically conducting leads 204 and 206 lead from each probe tip assembly as above indicated toward a diode matrix 208. In the construction of FIG. 8, however, the diode matrix 208 may be separated from the probe tip by a length of cable 209 with dual outer and inner shields 210 and 212 connected to the outer and inner cylindrical conductors 196 and 198 respectively and having the leads 204 and 206 contained within them. The cable 209 containing the shields 210 and 212 terminates in a circuit housing 214 containing measurement circuitry 216 including a diode matrix 208, capacitor arms 86 and 88, inductors 94 and oscillator 90 as described above. The shield 210 of the cable 209 allows the circuitry 216 to be located remotely from the region of the capacitive probe.

The circuit housing 214 is composed of two dielectrically spaced electrical conductors, an outer conductor 218 and an inner conductor 220, connected respectively to the outer and inner shields 210 and 212. The outer conductor 218 is in effect a circuit ground or common point and is desirable but not necessary to shield the circuitry 216. The inner conductor 220 does act as a shield and its presence is important for shielding the measuring circuitry 216.

The output of the oscillator 90 which feeds the capacitor arms 86 and 88 is also connected to the inner conductor 220 and in turn the inner shield 212 and inner cylindrical conductor 198.

Alternatively a D. C. blocking capacitor 222 may be connected between the oscillator 90 and the capacitor arms 86 and 88 and the inner conductor 220.

The inner cylindrical conductor 198, inner shield 212, and inner conductor 220 all function as a guard for the probe tip assemblies 202, the associated electrical leads 204 and 206, and the measuring circuitry 216. By guarding the assemblies 202 in the construction of FIG. 8 with a shield at substantially the same instantaneous electric potential as the leads 204 and 206 and the probe tips 50 and 68 in the assemblies 202, the effect of capacitance between ground potential and the leads 204 and 206 and tips 50 and 68 can be kept very small despite long distances and cable 209 lengths between the cylinder 194 and the circuit housing 214. The smaller the capacitance between ground and the leads 204 and 206, the higher is the sensitivity of the probe defined as the percent change in capacitance between ground and the lead 206 and tip 50 for a given change in the distance between the front tip 50 and the surface 100 from which distance is to be measured. Also environmental dependence is reduced since there is less capacitance to be affected.

A further advantage of the guarded capactive probe of FIG. 8 is that the equal potential on the inner cylinder 198 directs the electrical field flux from the measuring or front probe tip 50 toward the surface 100 and away from the outer cylinder 196. The presence of such a guard allows the capacitive probe to maintain its sensitivity at greater distances from the surface 100 than without the guard.

In FIGS. 9 and 10, a sectional view is shown of a modified form of a guarded capacitive probe. A conducting cylindrical housing 226 having a single conductor 226 is provided with each probe tip assembly composed of a dielectric substrate 228 with an electrically conducting central deposition 230 on the surface of the substrate 228. A guard is provided by an electrically conducting deposition band 232 surrounding the central deposition 230 on the substrate 228. As indicated by FIGS. 9 and 10 the ultimate construction of the capacitive probe may be either with the depositions 230 and 232 facing out from the interior of the probe, as shown in FIG. 9, or in the reverse configuration with the depositions facing in, as shown in FIG. 10. The construction of FIG. 10 presents the added advantage of protecting the depositions 230 and 232.

In the configurations of FIGS. 9 and 10 the guarding effect of the band 232 will be limited to directing the electric field from the central deposition 230 toward a measuring surface placed at a distance from the end of the capacitive probe. There will also be some effect from the deposition 232 in guarding the field between the cylindrical housing 226 and the central deposition 230 but to a lesser extent than in the case of the construction of FIG. 8.

If it is desired to operate the capacitive probes of FIGS. 9 and 10 remotely from the circuitry 216 of FIG. 8 with a cable connection therebetween, it will be necessary to provide a shielded cable 209 in which there is a connection from an inner shield 212 to the guard bands 232 and with the electrical leads from the central depositions 230 passing centrally through the shield of the cable 209.

The description now turns to consider the operation of circuitry designed for use with the above probes to give an output indication of the capacitance between the probe's measuring tip or electrode and a surface. The structure of this circuitry has already been described briefly above.

Figure 11:
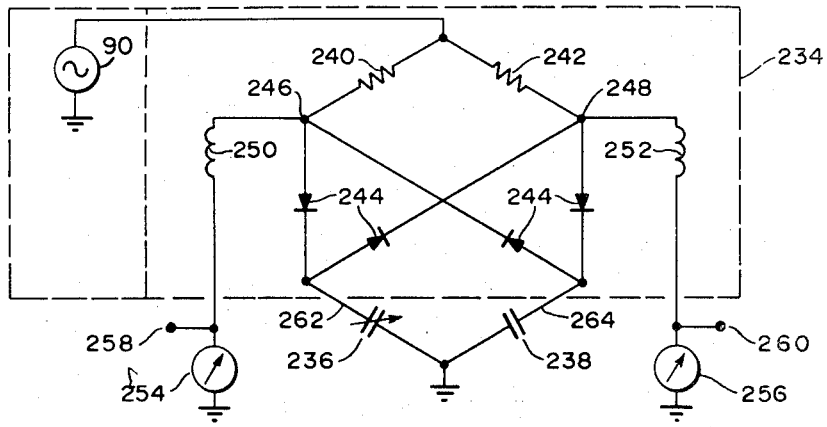
FIG. 11 is a partial block diagram and partial schematic diagram of an impedance measuring circuit or bridge cooperating with the capacitance of a capacitive probe.

Referring in particular to FIG. 11 there is shown an impedance measuring circuit or bridge 234 fed by an oscillator 90 and supplying exitation to detecting and reference capacitances 236 and 238 respectively. These capacitances 236 and 238 will normally be measuring and balancing capacitances respectively. Within the impedance measuring circuit 234 excitation supplied from the oscillator 90 is divided between impedances in arms 240 and 242 which impedances are normally characterized by having a DC open circuit and a substantially lower AC impedance than capacitances 236 and 238 at the frequency of oscillator 90. The current flowing through the impedances 240 and 242 is incident upon a diode matrix 244 which switches the current from the impedances 240 and 242 between the detecting and balancing reference capacitances 236 and 238, depending upon the polarity of the current from the oscillator 90.

In this manner the excitation through junction points 246 and 248, where the impedances 240 and 242 respectively join the diode matrix 244, will produce a signal at points 246 and 248 (as well as 262 and 264) with a DC component representative of the differences in capacitance between the detecting and reference capacitances 236 and 238. AC filtering inductors 250 and 252 join the junctions 246 and 248 respectively to meters 254 and 256 for providing a return to ground for this DC component and for indicating the DC component at junctions 246 and 248 without being masked by the substantially higher AC component from oscillator 90.

It is significant that the instantaneous voltage across capacitances 236 and 238 and oscillator 90 are approximately equal. This minimizes the effect of interelectrode capacitance and allows each electrode in the probes described to be closely placed or allows a multiplicity of electrodes described below. The guarded construction of FIG. 8 can also be easily realized as a result. One terminal each of the source, the measured capacitance, and the output may be grounded. Also substantial differences between the capacitances 236 and 238 are possible while the output indication still varies linearly with capacitance 236.

Output terminals 258 and 260 are connected to the junction point between each inductor 250 and 252 and meters 254 and 256 respectively. These output points 258 and 260 provide pick off terminals for the D. C. component at junctions 246 and 248 for further signal processing as explained below.

The detecting and reference capacitances 236 and 238 are indicated in FIG. 13 outside the impedance measuring circuit 234 but joined to it via leads 262 and 264 of the diode matrix 244. For convenience, hereafter, the terminals 262 and 264 will be considered as input terminals to the impedance measuring circuit or bridge 234 while the terminals 258 and 264 will be considered as output terminals of the circuit 234.

As can be seen from the above description in conjunction with FIG. 11, if both the detecting and reference capacitances 236 and 238 are equal the D. C. output on either output 258 or 260 will be zero. For small differences between these capacitances 236 and 238 the D. C. signal on output points 258 and 260 will be proportional to that difference.

For the probe of FIG. 2 that difference will be the capacitance between the tip 50 in the first probe tip assembly and the surface 100 from which distance is being gauged. Such capacitance, according to the standard formula for capacitance between parallel plates will be inversely proportional to the distance between the probe tip 50 and the surface 100 from which distance is being gauged. The output signal is thus inversely proportional to the distance between the tip 50 of the first probe tip assembly and the remote surface 100.

Figure 12:
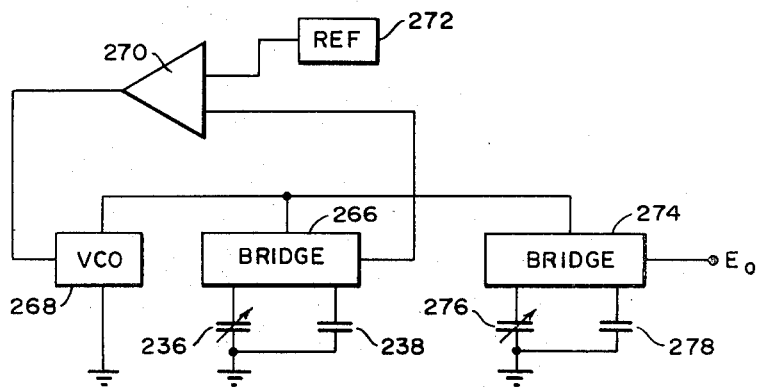
FIG. 12 is a block diagram of circuitry used to process the output of a capacitive probe for a direct distance indication.

FIG. 12 shows a modification of the FIG. 12 circuitry which provides an ultimate output directly proportional to distance being gauged instead of inversely proportional. A bridge 266 is identical to the impedance measuring circuit 234 but is instead excited by a signal controlled oscillator 268 whose controlling signal is supplied by a high gain regulator 270. The regulator 270 has differentially inputted to it a reference 272 and an output of the bridge 266 to form a negative feedback loop so that the excitation of oscillator 268 is controlled in a way which holds the output of the bridge 266 substantially equal to the reference 272.

The oscillator 268 also excites a bridge 274 which is identical to the bridge 266. The bridge 266 has detecting and reference capacitances 236 and 238 inputted to it. $C_A$ is defined as the difference between these capacitances. The bridge 274 has a set of detecting and reference capacitances 276 and 278 input to it. Defining $C_B$ as the difference in capacitance between capacitances 276 and 278, $I$ as the voltage of reference 272, $F$ as the frequency of oscillator 268, $V$ as the voltage output of oscillator 268 and $E$ as an output of bridge 274, the following equations apply:

$$VF\ C_A \propto I$$

$$VF\ C_B \propto E$$

$$E \propto IC_B/C_A$$

$E$ is thus proportional to the distance being measured or the reciprocal of the difference in detecting and reference capacitances from bridge 274.

Referring to FIGS. 13 and 14 there is shown respectively a vertical section and horizontal cross section of a self-compensating multiple probe tip capacitive probe having a rectangular electrically conducting cylindrical housing 280 enclosing first and second probe tip assemblies 282 and 284 respectively. Each probe tip assembly is substantially identical and consists of a dielectric sheet 286 having two plane parallel faces perforated with three holes which are in line from left to right across FIGS. 13 and 14 and pass perpendicularly between surfaces of the sheets 286. Into each hole an electrically conducting probe tip or electrode 288 is inserted and made flush with the surfaces of the dielectric sheet 286. A small amount of a ductile filler as mentioned above may be used between the dielectric sheet and the periphery of the electrically conducting tips 288.

An open end 290 of the cylindrical housing 280 has the first probe tip assembly 282 mounted flush with it and perpendicular to a central axis 292 of the cylindrical housing 280. The second probe tip assembly 284 is mounted parallel to the first assembly 282 and back from the open end 290 within cylindrical housing 280. An exterior surface 294 of the first probe tip assembly 282 faces an electrically conducting plate 296 having a surface 298 substantially parallel to the exterior surface 294 of the first probe tip assembly 282 to define a path between the surfaces 298 and 294 through which a strip or band of dielectric material 300 can pass in a direction perpendicular to the drawing surface of FIG. 13.

The measuring tips or electrodes in the first probe tip assembly 282 should be positioned with regard to the dimensions of the dielectric strip 300 and in particular to its left and right hand edges 302 and 304 respectively (as shown in (FIG. 13) so that the edges 302 and 304 will fall between the plate surface 298 and left and right electrically conducting measuring probe tips 306 and 308 respectively. A central electrically conducting measuring probe tip 310, intermediate the tips 306 and 308 will then have between it and the plate surface 298 a continuous portion of the dielectric strip 300.

Inserted in the dielectric sheet 286 of the second probe tip assembly 284 are the electrically conducting balancing probe tips 312, 314 and 316 which correspond in position in the second probe tip assembly 284 to the electrically conducting measuring probe tips 306, 308 and 310 in the first probe tip assembly. In this manner three electrode sets of balancing and measuring tips or electrodes are defined, each composed of a measuring and balancing tip or electrode from corresponding positions in the first and second probe tip assemblies 282 and 284. Electrical leads 318 are connected, one to each electrically conducting tip or electrode, and are lead through the capacitive probe away from the plate 296 to circuitry to be described below.

Though the self-compensating multiple tip probe as shown in FIGS. 13 and 14 has all electrode sets within a single housing, it is possible for several single electrode set housings like that in FIG. 2 to be fixtured together to produce a multi-tip probe with a path between a plate surface 252 and a surface of the probe which is a composite of several measuring electrodes from the several separate housings.

For high measuring accuracy in the probe of FIGS. 13 and 14 certain critical dimensions must be held to high tolerances (on the order of ±0.0001 inches) while others can be kept to general machining tolerances (±0.005 inches or better). The critical dimensions are:

1. Equality between tips of the same set in the peripheral axial thickness and area of the perimeter edge of each tip or electrode that faces the housing 280; and
2. Equality between tips of the same set in the spacing through the dielectric sheets 286 and their axial thickness to the housing 280.

Because all tips will be operated at approximately the same electric potential, the spacing between them is less critical.

Figure 15:
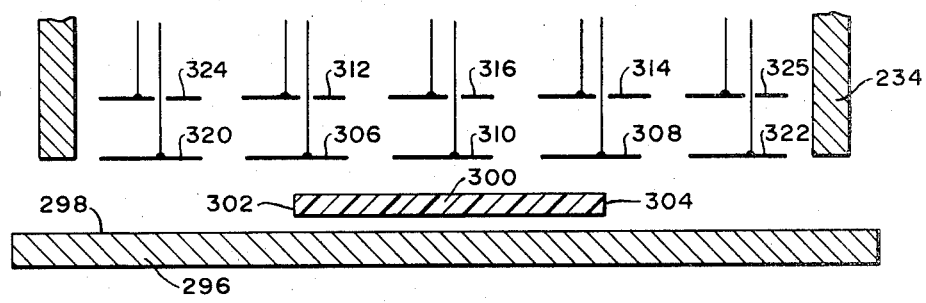
FIG. 15 is a schematic and sectional view of a multiple electrode capacitive probe used for sensing distance, and the width and thickness of a dielectric strip.

The multiple tip capacitive probe of FIGS. 13 and 14 is particularly suitable for gauging variations in the edge 302 to edge 304 width of the dielectric strip 300 with compensation for variations in the thickness and/or dielectric constant of the strip 300. This can be accomplished by detecting variations in the capacitance between the plate surface 298 and the tips 306 and 308 which will be indicative of both width and thickness variations of the dielectric strip 300. Variations in the capacitance due to fluctuation in the thickness or dielectric constant of the strip 300 can then be compensated for by variations in the capacitance between the plate surface 298 and the intermediate tip 310 since these variations will be the result only of thickness or dielectric constant fluctuations in the dielectric strip 300.

Where the distance between the probe and surface is likely to vary, an additon to the probe of FIGS. 13 and 14 is required to provide compensation for the variation. This modified probe is shown in FIG. 15 in a diagrammatical and sectional elevation view. In the FIG. 15 construction two additional electrode sets composed of measuring electrodes or tips 320 and 322 and balancing tips 324 and 325 are placed either side of the three electrode sets of FIGS. 13 and 14. The surface 298 of the plate 296 must extend so that all five electrode sets face it. The measuring tips 306, 308 and 310 are positioned relative to the dielectric strip 300 in the same way as indicated for FIGS. 13 and 14. The measuring tips 320 and 322 then face the surface 298 without any portion of the strip 300 intervening.

It is here convenient to indicate the formulae giving the capacitance between the surface 298 and the measuring tips 306, 308, 310, 320 and 322 in terms of the separation and properties of the intervening strip 300. These capacitances, which are $C_{306}$, $C_{308}$, $C_{310}$, $C_{320}$, and $C_{322}$ respectively, are given as follows:

$$C_R = C_{310} = k_1 [ak_2/(D-t)k_2 + tk_1] \qquad (1)$$

$$C_{306} = l(a-p_1)k_1/D + lp_1 k_1 k_2/(D-t) k_2 + tk_1$$
$$C_{308} = l(a-p_2) k_1/D + lp_2 k_1 k_2/(D-t) k_2 + tk_1$$
$$C_D = C_{306} + C_{308} = lk_1 [2a-p_1-p_2/D + k_2(p_1 + p_2)/(D-t) k_2 + tk_1] \qquad (2)$$

$$C_p = C_{320} = C_{322} = alk_1/D \qquad (3)$$

where:
 $a$ = width of each measuring tip;
 $D$ = distance from the measuring tips to the surface 298;
 $k_1$ = permittivity of the probe environment
 $k_2$ = permittivity of the dielectric strip 300;
 $l$ = length of each measuring tip;
 $p_1$ = the amount of the tip 306 that the strip 300 extends below in the a direction;
 $p_2$ = the amount of the tip 308 that the strip 300 extends below in the a direction; and
 $t$ = the thickness of the dielectric strip 300.

Turning now to consider systems which accomplish the gauging of the width of a dielectric strip 300 using the apparatus of FIGS. 13, 14 and 15 and the circuitry of FIG. 11 it can be seen that if the detecting capacitance 236 in the FIG. 11 is a parallel combination of the capacitance between ground and the electrically conducting tips 306, 308 and 316 while the reference capacitance 238 is a parallel combination of the capacitance between ground and the electrically conducting tips 312, 314 and 310, the output at either point 258 or 260 will be representative of variations in the width and thickness and dielectric constant of the dielectric strip 300 as the strip 300 is passed between the probe and the plate surface 298.

Specifically, the output at either point 258 or 260 will be proportional to $C_D - C_R$ as given above. The derivative with respect to $t$ is:

$$d(C_D - C_R)/dt + lk_1 k_2 (a - p_1 - p_2)(k_1 - k_2)/(D-t)(k_2 + tk_1) 2$$

This can be made zero if $a = p_1 + P_2$ at a nominal width for strip 300 and will remain very close to zero for small width variations or variations in $p_1 + p_2$ from a nominal strip 300 width. Under these circumstances the outputs of points 258 and 260 of the impedance measuring circuitry 234 of FIG. 11 will vary from zero with and only with variations in the width of the strip 300 shown in FIGS. 14 and 15.

Turning now to the block diagrams and partial schematics of FIGS. 16 and 17 means are shown for gauging the width and thickness of the dielectric strip 300 using a capacitive probe of the type shown in FIGS. 13, 14 or 15.

In FIG. 16, a series of paired electrode sets 326, 328, 329, 330 and 331 represent respectively the measuring and balancing capacitances to ground from each set of electrodes or tips 306 and 312; 308 and 314; 310 and 316; 320 and 324; and 322 and 325 in FIG. 15. The ungrounded side of these paired capacitances 326, 328, 329, 330, and 331 are connected to input terminals of bridge circuits 332, 334, 336 and 337 respectively with an electrical connection between each measuring electrode and between each balancing electrode of the sets 330 and 331 so that the parallel combination from these sets is inputted to bridge 327. The bridge circuits 332, 334, 336 and 337 are typically duplicates of the impedance measuring circuit shown in FIG. 11, and their inputs correspond to the inputs 262 and 264.

An output of bridge 332 is fed to an input of a summer amplifier 338. Fed into a second input of summer 338 is an output of the bridge 334. Through proper interconnection between the paired capacitances 326 and 328 and inputs 262 and 264 of the bridges 332 and 334 and proper selection of the outputs 258 and 260 of these bridges the output of the summer 338 can be made equal to $C_D$ as given in equation (2) above. This can be accomplished by connecting the tips 312 and 314 to the 262 inputs and the tips 306 and 308 to the 264 inputs and by using the 258 outputs of the bridges 332 and 334. Alternatively bridge 334 could be eliminated with both tips 312 and 314 connected to the 262 input of bridge 332 and with both tips 306 and 308 connected to the 264 input as similarly done with bridge 337 and sets 330 and 331. The output of summer 338 is then replaced by the output of bridge 332.

A voltage controlled oscillator 340 outputs an alternating electric potential fed to the bridges 332, 334, 336 and 337 as excitation. The excitation VF, of the output of the oscillator 340 is controlled by the signal input to it from a regulator 342. The output signal of summer 338 (or alternatively of bridge 332) to a terminal 344 is thus proportional to $F C_D$ where $C_D$ is given by equation (2). The output of signal of bridge 336 to a terminal 346 is proportional to $FC_R$ from equation (1) and the output signal of bridge 337 to terminal 348 is proportional to $F C_p$ from equation (3).

The terminals 344, 346, and 348 may be connected to various terminals of analog or digital logic circuitry to process these signals to yield a signal representative of the width of the strip 300 without variations due to changes in $K_2$, $t$ or $D$, the strip permittivity, thickness or distance between probe and surface respectively. The functional elements of this logic circuitry will now be described in conjunction with FIG. 16.

Figure 17B:
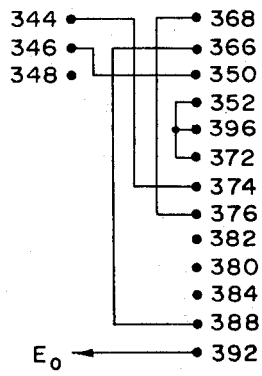
Figure 17C:
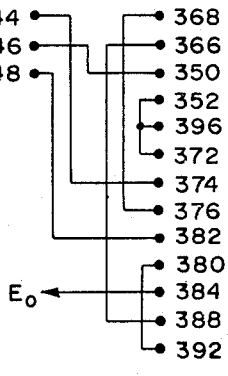

The FIGS. 17a–17c indicate various interconnection schemes between this logic circuitry and the terminals 344, 346, and 348.

The regulator 342 controlling the oscillator 340 has input terminals 350 and 352 which receive a signal dependent on the frequency of oscillator 340. The regulator 342 adjusts this frequency until the signals on terminals 350 and 352 are substantially equal.

A bridge 354, substantially the same as bridge circuit 234 and excited by oscillator 340, has fixed capacitances 356 and 358 between ground and the inputs 262 and 264 of the bridge 354. The capacitances 356 and 358 are of a value approximately the same as nominal capacitances in the sets 326, 328, 329, 330, and 331, but differ by a fixed amount defined as $C_F$. The 258 output of bridge 354 is differentially inputted to a differential amplifier 360 along with a constant 362. The output of amplifier 360 is fed to a denominator input of a divider circuit 364 which outputs to a terminal 366 the quotient of a signal on a numerator input to the divider 364 from a terminal 368 divided by the signal at its denominator input.

A differential amplifier 370 is also provided in the logic circuitry and has two differential inputs connected to terminals 372 and 374 with an output of the amplifier 370 conducted to a terminal 376. A further divider circuit 378 operates like the divider circuit 364 and has its numerator input, denominator input, and output connected to terminals 380, 382, and 384 respectively. A differential amplifier 386 has two differential inputs with the non-negating input connected to a terminal 388, the negating input connected to a constant signal source 390, and the output connected to a terminal 392. Finally a source of a constant reference signal 394 has that reference signal, I, connected to a terminal 396.

In FIG. 17a, the first alternative interconnect system among the terminals of FIG. 16 is shown with the terminals connected as follows: 344 to 374; 348 to 350; 396 to 352 and 372; and 376 to 388.

With the configuration of FIG. 17a the signal at terminal 346, $VF\ C_R$, is kept equal to $I$ at terminal 396 by the regulator 342. Thus, $$VF = I/C_R \qquad (4)$$

The signal at terminal 344 is $FC_D$ and after substituting for $F$ from equation (4) is $IC_D/C_R$. Terminal 376 after amplifier 370 then has $$I(C_D - C_R)/C_R \qquad (5)$$

This can be expressed in terms of the physical dimensions of the probe as $$I(C_D - C_R)/C_R = It(k_1 - k_2)(a - p_1 - p_2)/a\, k_2\, D \quad (6)$$

Assuming that $D$ can be kept constant by proper fixturing of the probe of FIG. 15 relative to the surface 298, equation (6) can be made independent of variations in $t$ at a nominal value of $p_1 + p_2$ by designing the probe for $a = p_1 + p_2$. In this way variations in t affect only the sensitivity of the system and not the existence of a deviation from the nominal value for $p_1 + p_2$.

Finally amplifier 386 and constant 390 allow scaling of equation (6) and the addition of an offset respectively so that the output, Eo, at terminal 392 may be made equal to the width of strip 300.

In FIG. 17b the terminals are interconnected as follows: 344 to 374; 346 to 350; 368 to 376; 396 to 352 and 372; and 366 to 388.

The circuit operation produced by the connections in FIG. 17b follow those in FIG. 17a except that terminal 376, the output of amplifier 370 corresponding to equation (6), is fed to terminal 368, the numerator input of divider 364 for division by the output of amplifier 360 on the denominator input.

The output of bridge 354 is $$VFC_F = I\ C_F/CR = t\ (k_1 - k_2 + D\ k_2/a\ l\ k_1\ k_2$$

(7)

If the gain of amplifier 360 is a $l\ k_1\ k_2$ and the value of constant 362 is $D\ k_2/a\ l\ k_1\ k_2$ the output of amplifier 360 becomes $t\ (k_1 - k_2)$. Divider 364 then produces as its output a signal with the value:

$$Eo = I(a-p_1 - p_2)/a\ k_2\ D$$

(8)

which varies directly with the width of the strip 300. Amplifier 386 and constant 390 then operate the same as in FIG. 17*a* to output at terminal 392 a signal which may be made equal to the width of strip 300 or its deviation from a preselected value.

In FIG. 17*b* it has been assumed that the distance $D$ between probe and surface does not vary significantly. FIG. 17*c* shows an arrangement which allows $D$ to be eliminated as a factor in the output of the logic circuitry when $D$ varies.

In FIG. 17*c* the terminal connections are: 344 to 374; 346 to 350; 348 to 382; 368 to 376; 366 to 388; 396 to 352 and 372; and 380 to 392. The operation is similar to FIG. 17*b* except that the output of amplifier 386 is divided by $C_p$ from equation (3) present at terminal 348 to eliminate $D$ from equation (8).

Referring now to FIG. 18, a further example is shown of a system for use in conjunction with the width measuring gauge of FIGS. 13 and 14 which system will provide an output varying directly with the width of the dielectric strip 300 where $D$ is constant. Shown in FIG. 18 are two pairs or sets of measuring and balancing capacitances 400 and 402. Each capacitance in the pair 400 is a parallel combination of the respective balancing and measuring capacitances between ground and the outside electrically conducting tips in FIG. 13., i.e., tips 306 and 308 are electrically joined and tips 312 and 314 are joined. The pair 400 feeds a bridge 404 in a manner such that the output of the bridge 400 as amplified by an amplifier 406 connected on the output of bridge 404 is equal to $C_D$ from equation (2). The pair 402 with leads from tips 310 and 316 feeds a bridge 408 which in turn through an output terminal feeds amplifier 410 to yeild at the output of the amplifier 410 a signal equal to $C_R$ from equation (2). These signals are differentially combined in an amplifier 412 to produce an output equal to $(C_D - C_R)$. This output of amplifier 412 is fed to a divider 414 on a numerator input. The denominator input of the divider 414 is connected to the output of amplifier 410. The output, $E_O$, of the divider 414 is consequently $C_1 + C_3 - C_2/C_2$.

In order to eliminate variations in the signal $E_o$ due to variations in the thickness, $t$, of the dielectric strip 300 an inverter 416 is fed by the output of amplifier 410 and the inverter 416 outputs a signal equal to $l/C_R$. An amplifier 418 of gain $l\ a\ k_1\ k_2$ fed differentially the output of inverter 416 and a constant 420 equal to $D/l\ a\ k_1$ will output a signal equal to the variable $t\ (k_1 - k_2)$. An additional divider 422 is fed $E_o$ on a numerator input and the output of amplifier 418 on a denominator input. The output of the divider 422 will be equal to $E_o/t\ (k_1 - k_2)$. The $E_o/t\ (k_1 - k_2)$ output of the divider 422 is then fed to an aimplifier 424 as one input with a constant 426 added differentially to a second input of the amplifier 424. The output will be a signal equal to the width of the dielectric strip 300 after suitably adjusting the gain of the amplifier 424 and the value of the constant 426 as indicated above for amplifier 386 and constant 390 in FIG. 16.

What I claim is:

1. In a dimension measuring gauge operating by sensing capacitance, a capacitive probe comprising:
    an electrically conductive housing having an opening;
    at least one measuring electrode; means for supporting each of said measuring electrode within and insulating it from said housing near the opening of said housing;
    at least one balancing electrode corresponding to each said measuring electrode and of similar dimensions to its corresponding measuring electrode; means for supporting each said balancing electrode within and for insulating it from said housing, said means for supporting said balancing electrode being dimensioned similar to said means for supporting said measuring electrode; and
    means for exciting said measuring and balancing electrodes with flunctuating electric current relative to a ground potential which includes said housing and for indicating a difference in the current to said ground potential from said measuring and balancing electrodes.

2. The probe of claim 1 wherein said means for exciting and for indicating further includes means for maintaining approximate equality in the instantaneous electric potentials to said measuring and balancing electrodes.

3. The probe of claim 1 wherein said means for exciting and for indicating includes: a. an oscillator; b. means for directing current from said oscillator through first and second arms of a ring to said measuring and balancing electrodes with one arm of said ring conducting current to each said measuring electrode and the other arm conducting current to each said balancing electrode during one polarity of current through said ring and with each arm of said ring supplying current to the other of each said measuring and balancing electrodes during the opposite polarity, the average current through each said arm of said ring being a signal indicative of the difference in the current to said ground potential from said measuring and balancing electrodes.

4. Apparatus for electronically detecting variations in a first parameter affecting the capacitance between a probe and a surface comprising:
    a. a surface;
    b. a capacitive probe having a plurality of electrode sets with each set comprising a measuring electrode spaced near said surface to define a path between said surface and said measuring electrodes, the capacitance between each said measuring electrode and said surface being affected by a plurality of parameters including said first parameter, in differing ways for each said measuring electrode;
    c. means for generating a signal for each said measuring electrode, each said signal tending to vary with the capacitance between its corresponding measuring electrode and said surface; and,
    d. means for processing said signals to yield an output representative of said first parameter in substantial isolation from the effects of the other of said parameters.

5. The apparatus of claim 4 wherein one of said parameters is the distance between said surface and said capacitive probe.

6. The apparatus of claim 4 wherein:
   a. said means for generating a signal further comprises an oscillator outputting an alternating electric potential, each said signal varying with the frequency and level of the output of said oscillator; and,
   b. said means for processing further includes means for controlling the output of said oscillator to maintain constant one of said signals.

7. The apparatus of claim 6 wherein the signal which is maintained constant by said means for controlling tends to vary with the distance between said surface and said capacitive probe.

8. The apparatus of claim 4 wherein:
   a. said first parameter comprises the edge to edge width of a dielectric strip which strip is channeled along said path between said probe and said surface; and,
   b. said means for generating further includes:
      i. means for developing a first signal among said signals tending to vary with the capacitance between said surface and at least two first measuring electrodes of at least two respective first electrode sets through at least two first areas respectively which first areas include opposite edges of said dielectric strip;
      ii. means for developing a second signal among said signals tending to vary with the capacitance between a second measuring electrode of a second electrode set and said surface through a second area including a region of said dielectric strip between the edges of said dielectric strip.

9. The apparatus of claim 8 further comprising means for developing a third signal, among said signals, representative of the capacitance between said surface and at lease one fourth measuring electrode of a fourth electrode set through a fourth area excluding all portions of said dielectric strip.

10. The apparatus of claim 9 wherein said means for processing is further characterized by including:
    a. means for deriving from said third signal a distance signal representative of the distance between said surface and said probe; and,
    b. means for combining said distance signal with said first and second signals to eliminate the effect of variations in said distance signal on said output.

11. The apparatus of claim 8 wherein:
    a. said means for generating a signal further includes an oscillator for supplying alternating electric potential, said first and second signals varying directly with the frequency and level of said alternating electric potential; and,
    b. said means for processing further includes means for adjusting the output of said oscillator to maintain the level of said second signal at a preselected level.

12. The apparatus of claim 11 wherein:
    a. means is provided for converting the variations in the output of said oscillator to a thickness signal varying with the variations in the thickness of said strip; and,
    b. said means for processing further comprises means for combining said thickness signal with said first signal to eliminate the effect of variations in the thickness of said strip from said output.

13. The apparatus of claim 12 further comprising means for developing a third signal, among said signals, representative of the capacitance between said surface and at least one third measuring electrode through an area excluding all portions of said dielectric strip.

14. The apparatus of claim 13 wherein said means for processing is further characterized by including:
    a. means for deriving from said third signal a distance signal representative of the distance between said surface and said probe; and,
    b. means for combining said distance signal with said first and second signals to eliminate the effect of variations in said distance signal on said output.

15. The apparatus of claim 4 wherein said capacitive probe further comprises:
    a. at least one housing; and,
    b. in each said electrode set a balancing electrode within the same housing and substantially identical in shape and orientation to the measuring electrode of that set, each said measuring electrode of that electrode set placed between said surface and the balancing electrode of that set.

16. The apparatus of claim 15 further characterized by having means for inhibiting the presence of matter from the environment of said probe in regions of electrostatic flux between said housing and each said electrode.

17. The apparatus of claim 15 wherein:
    a. said first parameter comprises the edge to edge width of a dielectric strip which strip is channeled along said path between said probe and said surface; and,
    b. said means for generating further includes:
       i. means for developing a first signal among said signals representative of the capacitance between said surface and at least two first measuring electrodes of at least two respective first electrode sets through at least two first areas respectively which areas include opposite edges of said dielectric strip.
       ii. means for developing a second signal among said signals representative of the capacitance between a second measuring electrode of a second electrode set and said surface through a second area including a region of said dielectric strip between the edges of said dielectric strip.

18. The apparatus of claim 17 wherein:
    a. an oscillator is provided.
    b. said means for developing said first signal comprises means for directing current from said oscillator through first and second arms of a first ring to the measuring and balancing electrode of said first electrode sets with one arm of said first ring conducting current to each said measuring electrode and the other arm conducting current to each said balancing electrode during one polarity of current through said first ring and with each arm of said first ring supplying current to the other of each said measuring and balancing electrodes during the other polarity; and,
    c. said means for developing said second signal comprises means for directing current from said oscillator through first and second arms of a second ring to the measuring and balancing electrodes of said second electrode set with one arm of said second ring conducting current to said measuring electrode and the other arm conducting current to said balancing electrode during one polarity of current through said second ring from said oscillator and with each arm of said second ring supplying current to the other of each said measuring and balancing electrodes during the other polarity of current through said second ring.

19. The apparatus of claim 18 further including:
a. at least one third electrode set with a measuring and balancing electrode in each said third electrode set, each measuring electrode in each said third electrode set having a capacitance to said surface through a third area excluding all portions of said dielectric strip;
b. means for directing current from said oscillator through first and second arms of a third ring to the measuring and balancing electrodes of each said third electrode set with one arm of said third ring conducting current to each said measuring electrode and the other arm conducting current to each said balancing electrode during one polairty of current through said third ring and with each arm of said third ring supplying current to the other of each said measuring and balancing electrodes during the opposite polarity, the average current through either of said arms of said third ring being a distance signal representative of the distance between said probe and said surface; and,
c. in said means for processing means for combining said distance signal with said first and second signals to eliminate the effect of variations in said distance signal on said output.

20. The apparatus of claim 19 further characterized by having means for inhibiting the presence of matter from the environment of said probe in regions of electric flux between said housing and each said electrode.

21. The apparatus of claim 15 wherein:
a. said means for generating further includes means for developing a distance signal representative of the distance between said surface and the measuring electrode of at least one distance electrode set; and,
b. said means for processing further includes means for combining said distance signal with the other of said signals to eliminate the effect of variations in said distance signal on said output.

22. The apparatus of claim 21 wherein:
a. an oscillator is provided; and,
b. said means for developing said distance signal further includes means for directing current from said oscillator through first and second arms of a distance ring to the measuring and balancing electrodes of each said distance electrode set with one arm of said distance ring conducting current to each said measuring electrode and the other arm conducting current to each said balancing electrode during one polarity of current from said oscillator through said distance bridge and with each arm of said distance ring supplying current to the other of each said measuring and balancing electrodes during the other polarity.

23. In a dimension measuring gauge operating by sensing capacitance, a capacitive probe comprising:
a. an electrically conductive housing having an opening;
b. at least one measuring electrode;
c. means for supporting each said measuring electrode within and insulating it from said housing near the opening of said housing;
d. at least one balancing electrode corresponding to each said measuring electrode and of similar dimensions to its corresponding measuring electrode;
e. means for supporting each said balancing electrode within and for insulating it from said housing, said means for supporting said balancing electrode being dimensioned similar to said means for supporting said measuring electrode; and
f. at least one diode loop of four serially closed-loop connected diodes oriented for conduction in the same direction, said diode loop placed within said housing and having an electrical connection from each of two opposite junctions points, between diodes on said diode loop to said balancing and measuring electrodes respectively.

24. In a dimension measuring gauge operating by sensing capacitance, a capacitive probe comprising: a. an electrically conductive housing having an opening; b. at least one measuring electrode; c. means for supporting each said measuring electrode within and insulating it from each housing near the opening of said housing; d. at least one balancing electrode corresponding to each said measuring electrode and of similar dimensions to its corresponding measuring electrode; e. means for supporting each said balancing electrode within and for insulating it from said housing, said means for supporting said balancing electrode being dimensioned similar to said means for supporting said measuring electrode; f. means for exciting said measuring and balancing electrodes with approximately equal alternating electric potentials with respect to the potential of said housing and for producing a lower frequency component signal representative of the difference in response between said measuring and balancing electrodes to said alternating electric potentials; g. means for conducting said lower frequency component signal to an indicator of said lower frequency component; h. means for guarding said means for conducting with a surrounding conductor at approximately the same instantaneous potential as said means for conducting; and i. an inner conductor for guarding said measuring and balancing electrodes, said inner conductor surrounding said measuring and balancing electrodes, being insulatingly supported within an inner wall of said housing, and being at approximately the same instantaneous potential as is applied to said electrodes, whereby flux switching in the flux of each said measuring electrode from a surface being gauged to said housing is minimized.

* * * * *